(12) United States Patent  
Misawa et al.

(10) Patent No.: US 7,710,489 B2
(45) Date of Patent: May 4, 2010

(54) IMAGE REPRODUCING APPARATUS AND DIGITAL CAMERA

(75) Inventors: Takeshi Misawa, Asaka (JP); Kimiaki Nakada, Tokyo (JP); Toshita Hara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 605 days.

(21) Appl. No.: 11/552,743

(22) Filed: Oct. 25, 2006

(65) Prior Publication Data

US 2007/0053668 A1 Mar. 8, 2007

Related U.S. Application Data (62) Division of application No. 09/758,423, filed on Jan. 12, 2001, now Pat. No. 7,145,601.

(30) Foreign Application Priority Data

Jan. 14, 2000 (JP) ............................ 2000-006426
Jan. 14, 2000 (JP) ............................ 2000-006427
Jan. 14, 2000 (JP) ............................ 2000-006428

(51) Int. Cl.
H04N 5/222 (2006.01)
(52) U.S. Cl. ..................... 348/333.05; 348/333.11; 348/373; 348/231.99; 348/220.1
(58) Field of Classification Search ............ 348/333.01, 348/333.02, 333.05, 333.11, 373, 231.99, 348/220.1; 345/837, 838, 839, 845
See application file for complete search history.

(56) References Cited

U.S. PATENT DOCUMENTS

| 5,917,488 | A | 6/1999 | Anderson et al. |
| 6,023,520 | A | 2/2000 | Nagasaka et al. |
| 6,441,868 | B1 * | 8/2002 | Park .......................... 348/633 |
| 6,584,463 | B2 | 6/2003 | Morita et al. |
| 6,734,877 | B1 * | 5/2004 | Hondo et al. ............... 715/721 |
| 6,738,075 | B1 * | 5/2004 | Torres et al. ............... 715/723 |
| 6,778,223 | B2 * | 8/2004 | Abe ........................... 348/559 |

FOREIGN PATENT DOCUMENTS

| JP | 1-246989 | 10/1989 |
| JP | 3-142347 | 6/1991 |
| JP | 3-142437 A | 6/1991 |
| JP | 6-89549 A | 3/1994 |
| JP | 6-343146 | 12/1994 |
| JP | 8-315546 A | 11/1996 |
| JP | 9-163285 | 6/1997 |
| JP | 10-13773 A | 1/1998 |
| JP | 10-304301 A | 11/1998 |

(Continued)

*Primary Examiner*—Gevell Selby
(74) *Attorney, Agent, or Firm*—Birch, Stewart, Kolasch & Birch, LLP (57) ABSTRACT

An image reproducing device that displays frames or index images of still images and moving images so that a user can distinguish the still images from the moving images when looking at them in one-frame reproducing or index reproducing. The display style of the still images is different from that of frames of the moving images For example, each still image has a white frame like a picture, and a frame of each moving image has perforations like a movie film. Therefore, the user can distinguish the still images from the moving images when looking at them.

6 Claims, 6 Drawing Sheets

FOREIGN PATENT DOCUMENTS

| | | |
|---|---|---|
| JP | 11-85949 | 3/1999 |
| JP | 11-120353 A | 4/1999 |
| JP | 11-136637 A | 5/1999 |
| JP | 11-284948 A | 10/1999 |
| JP | 11-289517 A | 10/1999 |
| JP | 11289517 * | 10/1999 |
| JP | 11-313316 | 11/1999 |
| JP | 2001-197447 | 7/2001 |

* cited by examiner

IMAGE REPRODUCING APPARATUS AND DIGITAL CAMERA

This application is a Divisional of co-pending application Ser. No. 09/758,423 filed on Jan. 12, 2001, and for which priority is claimed under 35 U.S.C. §120; and this application claims priority of Application No. 2000-006426 filed in Japan on Jan. 14, 2000, Application No. 2000-006427 filed in Japan on Jan. 14, 2000, and Application No. 2000-006428 filed in Japan on Jan. 14, 2000, under 35 U.S.C. §119; the entire contents of all are hereby incorporated by reference.

BACKGROUND OF THE INVENTION

1. Field of the Invention

The present invention relates generally to an image reproducing apparatus and a digital camera. The present invention relates more particularly to an image reproducing apparatus and a digital camera that select files from storage mediums storing files of both still images and moving images to reproduce still images or moving images.

2. Description of Related Art

A digital camera can record still images and moving images in a memory card and reproduce the images.

The digital camera displays index images of the still images and the moving images on an image monitor in index reproduction, and the user selects a still image or a moving image according to the index images and presses an execution button. The digital camera reads image data of the selected image from the memory card to display the selected still image or moving image on the image monitor.

Also, the digital camera displays the still images and the first frames of the moving images when the user presses a next image button or a last-image button in one-frame reproduction. If the user presses the execution button when the first frame of a moving image is being displayed, the moving image is displayed.

However, the user can not grasp the moving images since only the first frames of the moving images are displayed in the index reproduction and the one-frame reproduction, and thus the user can not determine whether or not the user wants to reproduce the moving images.

Once moving image reproduction is started, the moving image reproduction can not be quickly stopped and the other images can not be reproduced until the moving image reproduction ends. This is because a CPU has a heavy load during the moving image reproduction.

In addition, the digital camera can record sound with the moving images and reproduce the sound with the moving image at the moving image reproduction. The digital camera can reproduce the images anywhere since the digital camera is portable. But, it is bothersome to reproduce a moving image with sound in a quiet place or a public place such as a train. For this reason, the digital camera has a volume adjusting function and an earphone jack.

But, the moving image can be reproduced with the sound with much volume in the quiet place, and the user does not always carry earphones. Also, if the moving image is recorded in a construction site or some other place, the user does not want to reproduce the unpleasant sound. In this case, the user needs to adjust the volume.

SUMMARY OF THE INVENTION

In view of the foregoing, it is an object of the present invention to provide an image reproducing device and a digital camera that display images so that a user can distinguish still images from moving images when looking at them in one-frame reproduction or index reproduction.

It is an object of the present invention to provide an image reproducing device and a digital camera that display images so that a user can grasp moving images in one-frame reproduction or index reproduction.

It is an object of the present invention to provide an image reproducing device and a digital camera that enable a user to determine to reproduce images with sound or reproduce only the images.

To achieve the above-mentioned object, the present invention is directed to an image reproducing apparatus comprising: a selecting device that selects a file from a storage medium storing both files of still images and files of moving images; a first display that displays a still image on an image monitor when the file selected by the selecting device contains image data of the still image; a second display that displays a frame of a moving image on the image monitor when the file selected by the selecting device contains image data of the moving image, a display style of the frame of the moving image being different from that of the still image; and a third display that displays the moving image on the image monitor if a user operates the image reproducing apparatus for moving image reproduction when the frame of the moving image is being displayed on the image monitor by the second display.

The second display may display perforations on both sides of the frame of the moving image, and the second display may shake the frame of the moving image.

To achieve the above-mentioned object, the present invention is directed to an image reproducing apparatus comprising: a selecting device that selects a file from a storage medium storing both files of still images and files of moving images; a first display that displays a still image on an image monitor when the file selected by the selecting device contains image data of the still image; a second display that consecutively and repeatedly displays frames of a moving image on the image monitor when the file selected by the selecting device contains image data of the moving image; and a third display that displays the moving image on the image monitor if a user operates the image reproducing apparatus for moving image reproduction when the frames of the moving image are being displayed consecutively and repeatedly on the image monitor by the second display.

To achieve the above-mentioned object, the present invention is directed to an image reproducing apparatus comprising: an index reproduction setting device that selects files from a storage medium storing both files of still images and files of moving images and sets index reproduction; and a display that constructs index images of the still images and the moving images of the files selected by the index reproduction setting device according to image data of the files and displays the index images on the image monitor when the index reproduction setting device sets the index reproduction, a display style of the index image of the moving image being different from that of the index image of the moving image.

The display may display perforations on both sides of the index image of the moving image, and the display may shake the index image of the moving image.

To achieve the above-mentioned object, the present invention is directed to an image reproducing apparatus comprising: an index reproduction setting device that selects files from a storage medium storing both files of still images and files of moving images and sets index reproduction; and a display that constructs index images of the still images and the moving images of the files selected by the index reproduction setting device according to image data of the files and displays the index images on the image monitor when the index reproduction setting device sets the index reproduction, the display shaking the index image of the moving image.

According to the present invention, the display style of the frames of the moving images is different from that of still images. For example, a frame of each moving image has perforations like a movie film, or the frame shakes, or some frames of the moving images are consecutively and repeatedly displayed. Thus, the user can distinguish the still images from the moving images.

The image reproducing apparatus further comprises a selecting device that selects a still image or a moving image according to the index images of the still images and the moving images displayed on the image monitor, and a device that displays the still image on the image monitor when the still image is selected by the selecting device and displays the moving image on the image monitor when the moving image is selected by the selecting device. A digital camera according to the present invention has the image reproducing device and records and reproduces the still images and the moving images.

To achieve the above-mentioned object, the present invention is directed to an image reproducing apparatus comprising: a selecting device that selects a file from a storage medium storing files of moving images; a first display that displays an image related to the moving image on an image monitor; a moving image reproduction setting device that sets moving image reproduction; and a second display that displays the moving image of the file selected by the selecting device on the image monitor when moving image reproduction is set by the moving image reproduction setting device.

The image related to the moving image is displayed on the image monitor so that the user can grasp the whole moving image. Therefore, the user can determine whether or not the user wants to reproduce the moving images before reproducing them.

The image related to the moving image is composed of frames of the beginning part, the middle part and the end part of the moving image, and the first display displays the frames together or sequentially. The storage medium stores files of still images, and the first display displays a still image on the image monitor when the still image is selected by the selecting device. A digital camera according to the present invention has the image reproducing, and records the still images and the moving images in the storage medium.

To achieve the above-mentioned object, the present invention is directed to an image reproducing apparatus comprising: a selecting device that selects a file of an image from a storage medium storing files of images with sound; a choosing device that chooses between image reproduction with the sound and image reproduction without the sound; and a reproducing device that reproduces the image and the sound when the choosing device chooses the image reproduction with the sound and reproduces only the image when the choosing device chooses the image reproduction without the sound. The user can choose between the image reproduction with the sound and the image reproduction without the sound, thus the user can reproduce only the image in a quiet place.

The storage medium stores files of images without sound, and the reproducing device reproduces the image and the sound only when the selecting device selects the image with the sound and the choosing device chooses the image reproduction with the sound. A digital camera according to the present invention has the image reproducing, and records the images with sound and the images without the sound in the storage medium.

BRIEF DESCRIPTION OF THE DRAWINGS

The nature of this invention, as well as other objects and advantages thereof will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
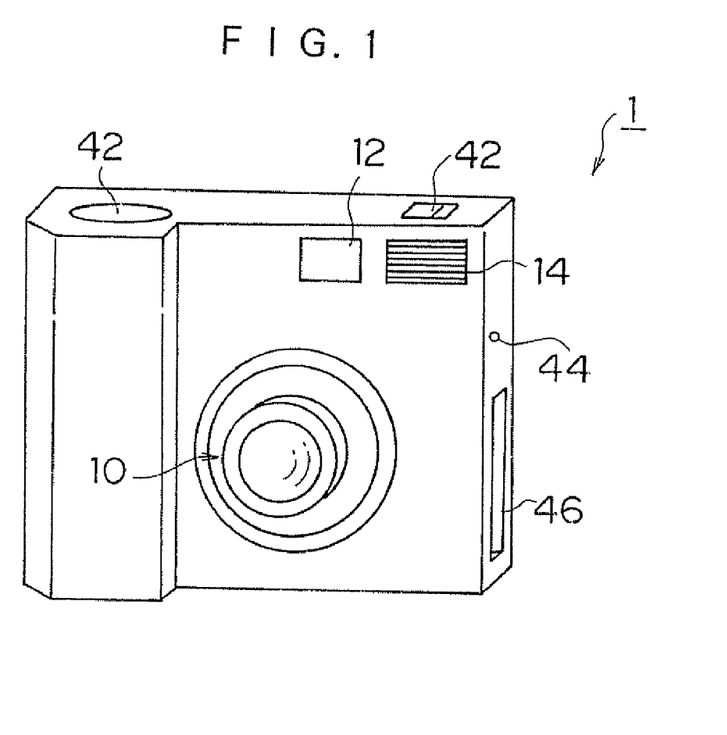
FIG. 1 is a front view showing the appearance of a digital camera according to the present invention.
Figure 2:
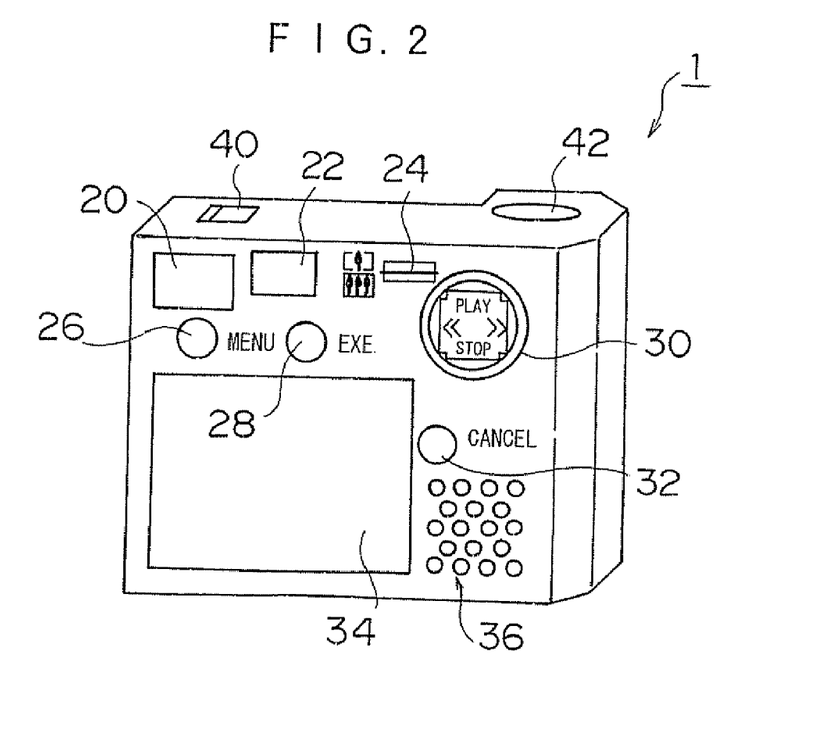
FIG. 2 is a back view showing the appearance of the digital camera in FIG. 1.

FIGS. 1 and 2 are a front view and a back view showing the appearance of a digital camera 1 according to the present invention, respectively.

The digital camera 1 can record and reproduce both moving images and still images. As shown in FIG. 1, a taking lens 10, a viewfinder window 12 and a light emitting part 14 are provided on the front of the digital camera 1. The light emitting part 14 is a white light emitting diode or a lamp.

As shown in FIG. 2, a display panel 20 displaying the recording time, the date, the residual capacity of a memory and so on, an eyepiece 22, a zoom button 24, a menu key 26, an execution key 28, a multifunction cross key 30, a cancel key 32, an image monitor 34 and a speaker 36 are provided on the back of the digital camera 1.

As shown in FIGS. 1 and 2, a power/mode switch 40 and a shutter release/recording start and stop button 42 are provided on the top of the digital camera 1, and an earphone jack 44 and a storage medium compartment 46 are provided on the right side of the digital camera 1 in FIG. 1.

The power/mode switch 40 has four positions; namely a position for turning OFF the power, a position for setting a still image shooting mode, a position for setting a moving image shooting mode, and a position for setting a reproducing mode. A power switch and a mode dial or the like may be provided instead of the power/mode switch 40.

Figure 3:
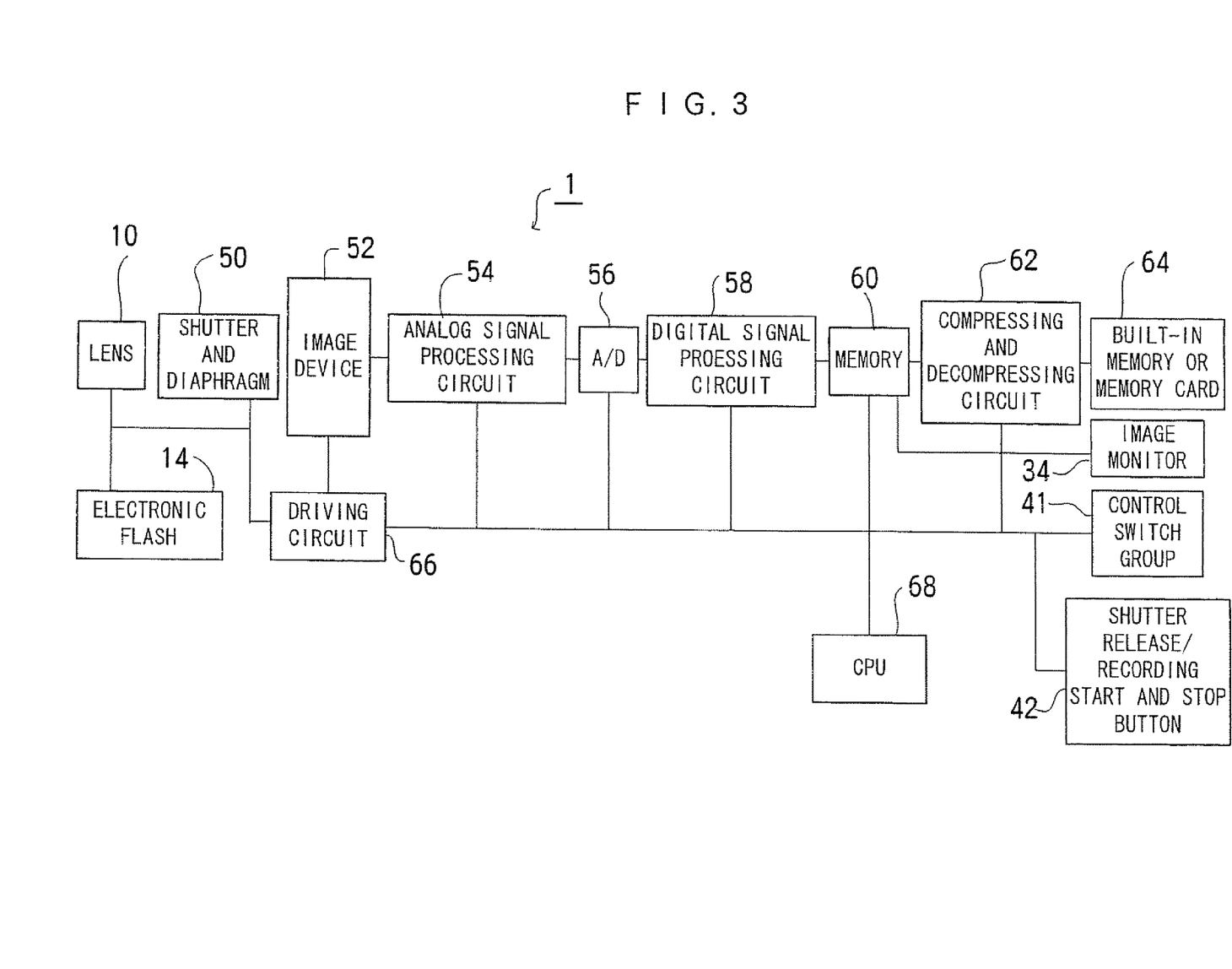
FIG. 3 is a block diagram showing the inner structure of the digital camera in FIG. 1.

FIG. 3 is a block diagram showing the inner structure of the digital camera 1 in FIGS. 1 and 2. The digital camera 1 comprises a control switch group 41 including the taking lens 10, the light emitting part 14, the image monitor 34, the cross key 30 and the power/mode switch 40, the shutter release/ recording start and stop button 42, a shutter and diaphragm 50, an imaging device 52 such as a CCD, an analog signal processing circuit 54, an A/D converter 56, a digital signal processing circuit 58, a memory 60, a compressing and decompressing circuit 62, a built-in memory or a memory card 64, a driving circuit 66 and a central processing unit (CPU) 68.

The CPU 68 controls the circuits of the whole camera according to input signals from the control switch group 41, the shutter release/recording start and stop button 42 and so on. If the power is turned ON and the still image shooting mode or the moving image shooting mode is set by the power/mode switch 40, a still image or a moving image is shot according to the operation of the shutter release/recording start and stop button 42. If the reproducing mode is set, a still image or a moving image is reproduced.

A light passes the taking lens 10 and the shutter and diaphragm 50 and reaches the imaging device 52. The shutter prevents smears due to an incidence of another light when signals are read from the imaging device 52, but it may be omitted in accordance with the structure of the imaging device 52. The diaphragm may be one diaphragm, and it may be composed of some diaphragms that can be switched. The light emitting part 14 emits a light to illuminate a subject when the brightness is low or it is made to do so regardless of the brightness The light emitting part 14 may be omitted in case the sensitivity of the imaging device 52 is high.

The imaging device 52 is driven with timing signals generated by a timing signal generating circuit (not shown) of the driving circuit 66 to output image signals. The driving circuit 66 also drives the taking lens 10, the shutter and diaphragm 50 and the light emitting part 14.

The image signals outputted from the imaging device 52 is processed by the analog signal processing circuit 54, and the A/D converter 56 converts the analog signals into digital signals, which is processed by the digital signal processing circuit 58. The processed image data is temporarily stored in the memory 60. When the image data is read from the memory 60, the moving image or the still image is displayed on the image monitor 34. The image data is compressed by the compressing and decompressing circuit 62 to be stored in the built-in memory or the memory card 64. The image data is not necessarily compressed according to the shooting mode. In the reproducing mode, the stored image data is decompressed by the compressing and decompressing circuit 62 and outputted to the image monitor 34 through the memory 60.

When the still image shooting mode is set and the shutter release/recording start and stop button 42 is pressed, the still image of one frame is captured and the image data of the still image is stored in the built-in memory or the memory card 64 as a file with a file name. When the moving image shooting mode is set and the shutter release/recording start and stop button 42 is pressed, the moving image is captured with a predetermined frame rate until the shutter release/recording start and stop button 42 is pressed again. The image data of the moving image is stored in the built-in memory or the memory card 64 as a file with a file name.

Files of still images and files of moving images are stored in a holder in order of the shootings whether they contain the still images or the moving images. Sound can be recorded by a sound recording device (not shown) in the moving image shooting mode, and the sound can be reproduced with the moving image in the reproducing mode.

The method of reproducing the still images or the moving images will now be explained.

The digital camera 1 has three types of image reproduction; namely a one-frame reproduction for reproducing the images one by one, an index reproduction for reproducing some index images (four index images in the embodiment) and a moving image reproduction for reproducing a moving image.

The moving image reproduction can be started when a frame of the moving image is displayed in the one-frame reproduction or the index reproduction. In the one-frame reproductions the displayed frame of the moving image is the first frame or the middle frame of the moving image.

When the reproducing mode is set, the one-frame reproduction automatically starts and one frame of the first file is reproduced on the image monitor 34. At this time, one frame of the last file may be reproduced instead of that of the first file. To reproduce another image, the user pushes the left key or the right key of the cross key 30. The images are sequentially reproduced if the user pushes the left key or the right key repeatedly.

In the index reproduction, four index images are displayed together. The user can choose an image he or she wants to reproduce by designated an index image with the up key, the down key, the left key or the right key of the cross key 30. The designated index image is enclosed by a frame to differentiate itself from the other index images. If the up key, the down key, the left key or the right key is operated beyond the range of the four index images, another four index images are displayed.

As described above, both the files of the still images and the files of the moving images are stored in the holder in order of the shootings. Both the still images and the frames of the moving images are displayed in the one-frame reproduction, and the index images of the still images and the index images of the frames of the moving images are displayed together in the index reproduction.

In the present invention, the display style of the still images is different from that of the frames of the moving images in the one-frame reproduction so that the user can distinguish them when looking at them. Likewise, the display style of the index images of the still images is different from that of the index images of the frames of the moving images in the index reproduction.

Figure 4:
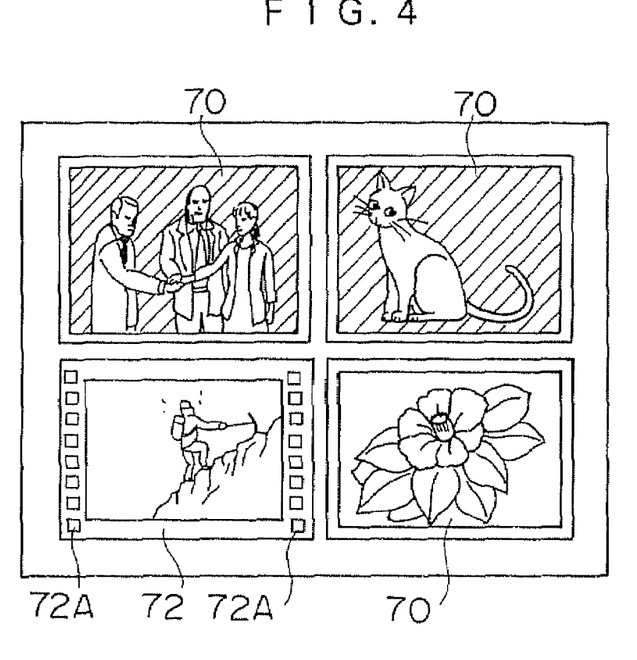
FIG. 4 is a drawing showing a display style of index images of still images and that of an index image of a frame of a moving image in index reproduction.
Figure 5:
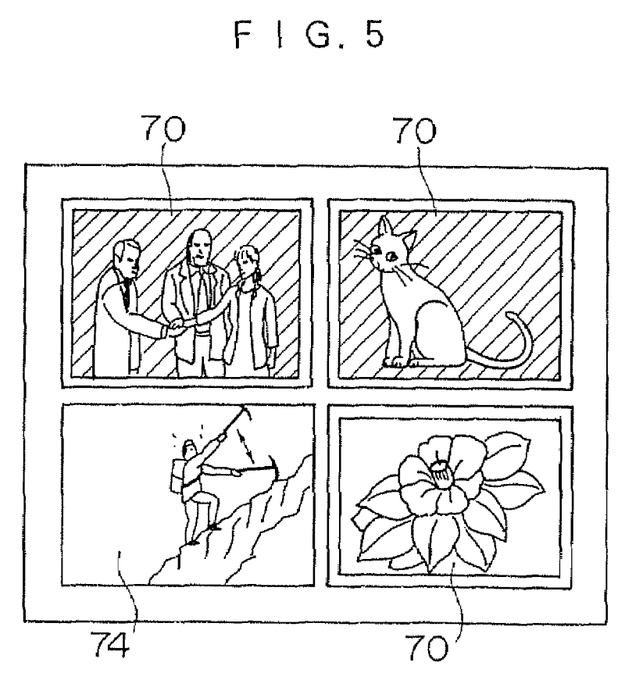
FIG. 5 is a drawing showing a display style of the index images of the still images and that of the index image of the frame of the moving image in the index reproduction.
Figure 6:
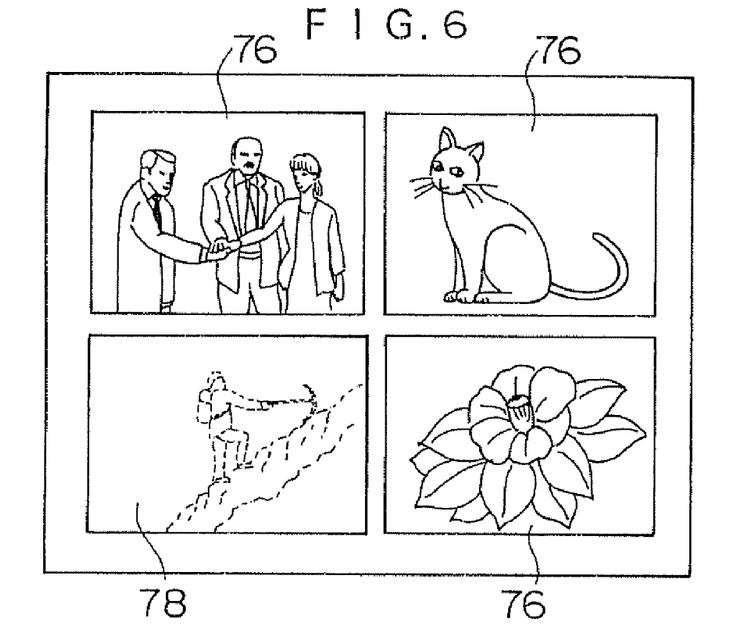
FIG. 6 is a drawing showing a display style of the index images of the still images and that of the index image of the frame of the moving image in the index reproduction.

FIGS. 4, 5 and 6 are drawings showing the display styles of the index images of the still images and those of the index images of the frames of the moving images in the index reproduction.

In FIG. 4, index images 70 of still images have white frames like pictures so that the user can realize that the images are the still images. Meanwhile, an index image 72 of a moving image has perforations 72A on both sides like a movie film so that the user can realize that the image is the moving image. Therefore, the user can distinguish the index images 70 of the still images from the index image 72 of the moving image when looking at them.

In FIG. 5, the index images 70 of the still images have the white frames in the same way as in FIG. 4, and an index image 74 of the moving image is composed of some frames that are consecutively and repeatedly displayed so that it looks like the moving image. The flames of the index image 74 are not necessarily consecutive frames of the moving image.

In FIG. 6, index images 76 of the still images and an index image 78 of the moving image do not have the white frames, and the index image 78 of the moving image vertically shakes. If the index image 78 irregularly shakes, the user regards that the digital camera 1 is out of order. Thus, the index image 78 may slightly shake and sometimes largely shake as if an old film such as an 8 mm-film were being played. This makes it possible for the user to realize that the image is the moving image.

In addition, the perforations 72A in FIG. 4 may be displayed on the index image 74 in FIG. 5 or the index image 78 in FIG. 6. In this case, the perforations 72A may vertically shake.

FIGS. 4, 5 and 6 show the display styles in the index reproduction, and the display style of the still images is different from that of the frames of the moving images in the one-frame reproduction so that the user can distinguish them when looking at them.

Figure 7:
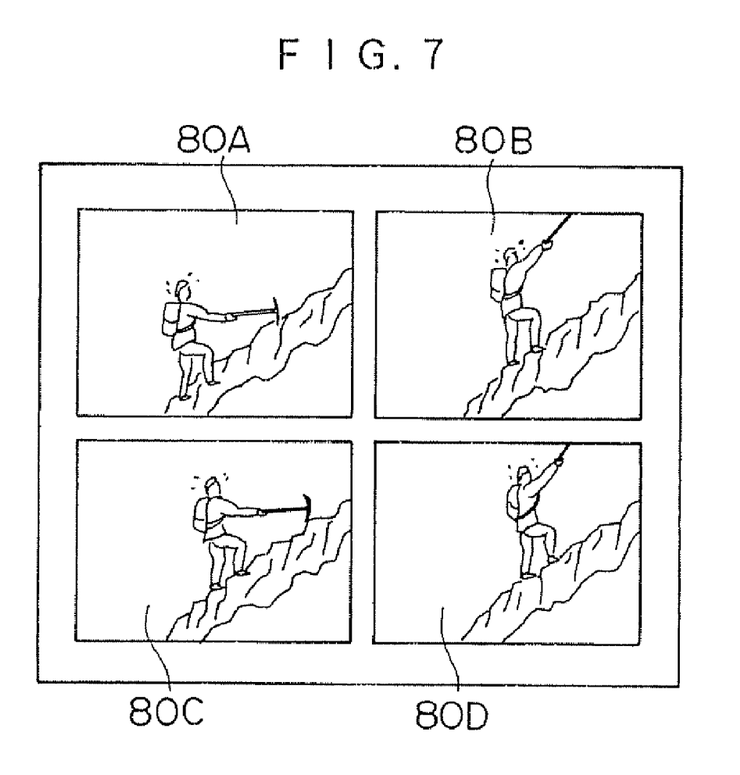
FIG. 7 is a drawing showing four frames of the moving image in one-frame reproduction.

Also, in the one-frame reproduction, four frames 80A, 80B, 80C and 80D of the moving image may be displayed as shown in FIG. 7 to differentiate the moving image from the still images.

The four frames 80A-80D of the moving image will now be explained.

The frame 80A is extracted from the beginning part of the moving image, and the frames 80B and 80C are extracted from the middle part of the moving image, and the frame 80D is extracted from the end part of the moving image.

In case the moving image is composed of 400 frames, the frame 80A is extracted from the 1st frame through the 100th frame, and the frame 80 is extracted from the 101st frame through the 200th frame, and the frame 80C is extracted from the 201st frame through the 300th frame, and the frame 80D is extracted from the 301st frame through the 400th frame.

The four frames 80A-80D of the moving image are displayed like a four-scene comic in this way, and thus the user can grasp the whole moving image before reproducing it.

The four frames 80A-80D are displayed in the embodiment, but the present invention is not limited to this. For example, nine frames may be displayed In this case, the moving image is divided into nine parts, and one frame is extracted from each part.

The first frame may not have any meaning in case of a frame-in or a wipe, and the last frame may not have any meaning in case of a frame-out or a wipe. Therefore, the frames may be extracted from the moving image excluding the first some frames and the last some frames. Image data of the index images is previously produced, and it may be stored in correspondence to the file of the moving image or in the file with the moving image.

In addition, the frames are displayed together in the embodiment, but the frames of the moving image may be displayed consecutively and repeatedly with predetermined time intervals. Likewise, four frames of the moving image may be displayed together as the index image in the index reproduction, but it is preferable to display the frames consecutively and repeatedly since the index image is small.

The procedure of reproducing still images and moving images will now be explained with reference to the flow chart of FIG. 8.

Figure 8:
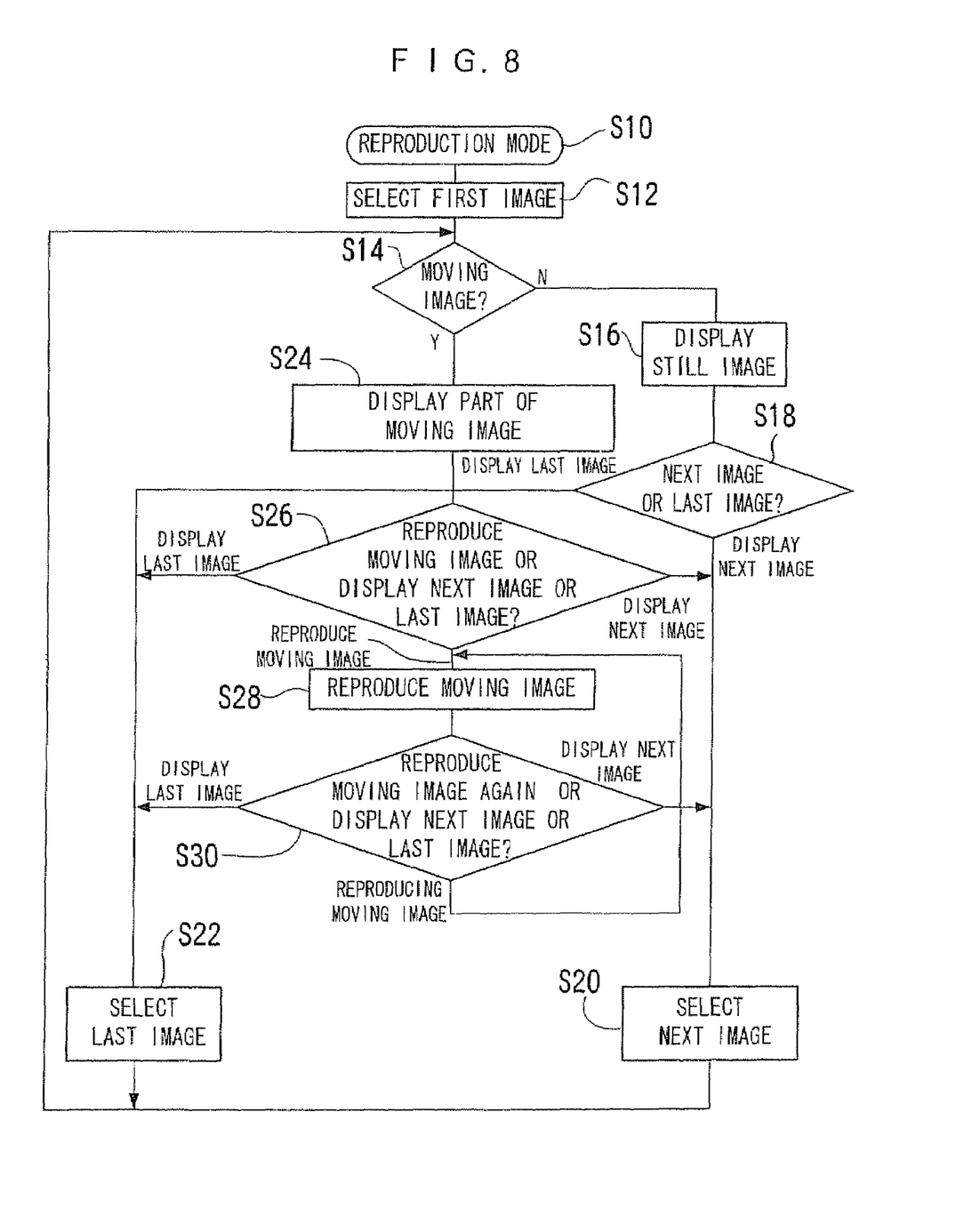
FIG. 8 is a flow chart showing a procedure of reproducing still images and moving images.

As shown in FIG. 8, when the reproduction mode is set (step 10), the one-frame reproduction automatically starts, and the CPU 68 reads the image data of the first file stored in the built-in memory or the memory card 64 (step 12).

Then, the CPU 68 automatically determines whether the file contains a still image or a moving image (step 14). If the file contains a still image, the CPU 68 displays the still image on the image monitor 34 according to the image data (step 16). Then, the user determines to display the last image or the next image by pressing the left key or the right key of the cross key 30 for (step 18). If the user presses the right key, the CPU 68 reads the image data of the next file (step 20) and returns to step 14. If the user presses the left key, the CPU 68 reads the image data of the last file (step 22) and returns to step 14.

On the other hand, if the file contains a moving image at step 14, the CPU 68 displays a part of the moving image (step 24). At this time, one frame of the moving image is displayed with perforations (see the index image 72 in FIG. 4), or some frames of the moving image are consecutively and repeatedly displayed (see the index image 74 in FIG. 5), or one frame of the moving image is displayed while shaking vertically (see the index image 78 in FIG. 6), or four frames of the moving image are displayed together (see the frames 80A-80D in FIG. 7).

Then, the user determines to reproduce the whole moving image or display the next image or the last image according to the displayed part of the moving image (step 26). If the user determines to reproduce the whole moving image, the CPU 68 displays the whole moving image on the image monitor 34 according to the image data (step 28). After that, the user determines to reproduce the moving image again or display the next image or the last image (step 30).

If the user presses the right key of the cross key 30 at step 26 or step 30, the CPU 68 reads the image data of the next file (step 20) and returns to step 14 If the user presses the left key at step 26 or step 30, the CPU 68 reads the image data of the last file (step 22) and returns to step 14.

In this way, the CPU 68 displays the whole moving image only if the user determines to reproduce the whole moving image at step 26 after the part of the moving image has been displayed at step 24. This is because that the CPU 68 has a heavy load once the moving image reproduction is started, and the moving image reproduction can not be quickly stopped, and the other images can not be reproduced until the moving image reproduction ends.

The procedure of reproducing the still images and the moving images will now be explained with reference to the flow chart of FIG. 9. The same steps as those in FIG. 8 is denoted by the same step numbers, and they will not be explained.

Figure 9:
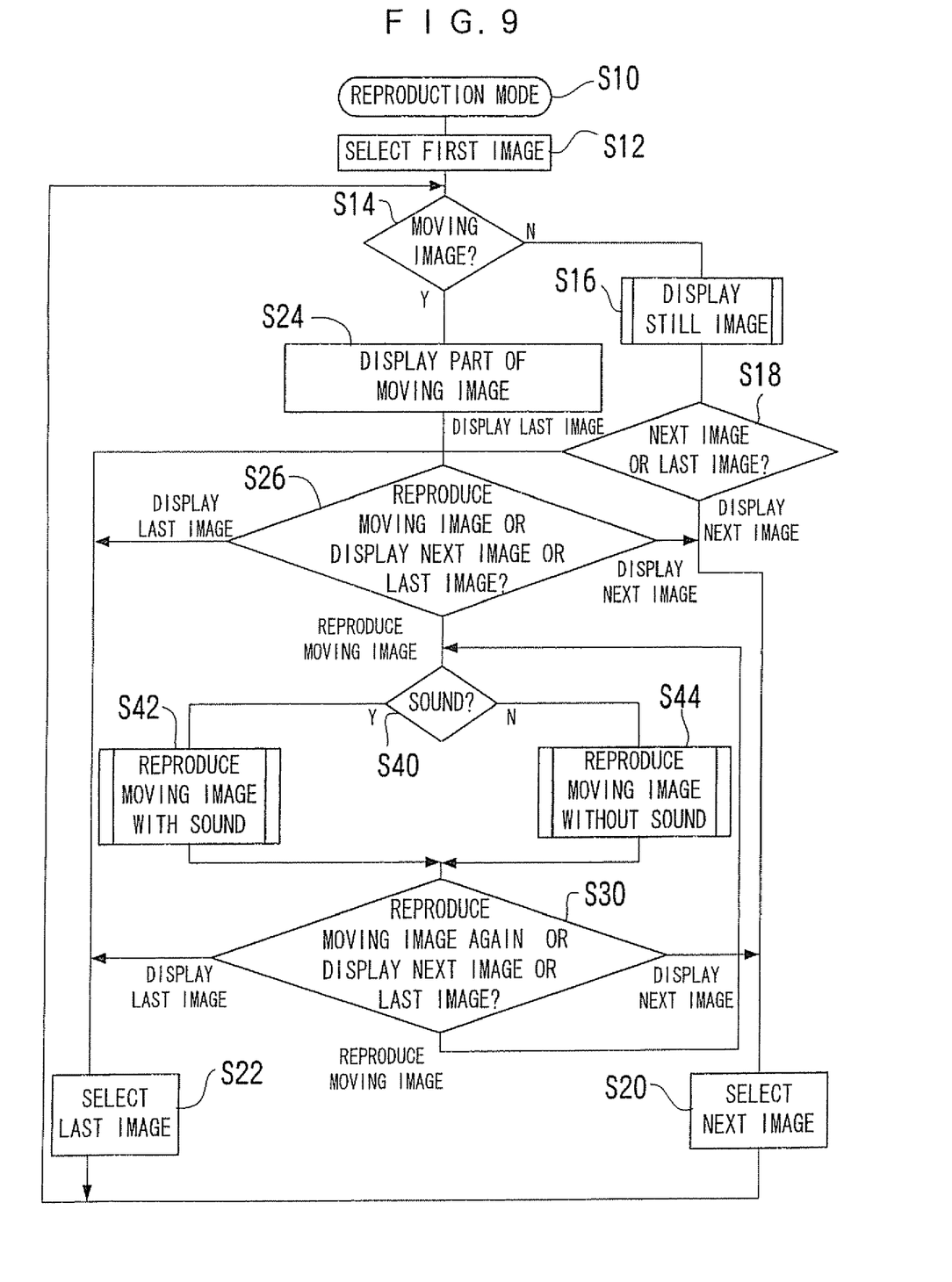
FIG. 9 is a flow chart showing a procedure of reproducing the still images and the moving images.

The flow chart of FIG. 9 is different from that of FIGS. 8 in that it has steps 40, 42 and 44 instead of step 28.

The digital camera 1 records sound with the moving image in the built-in memory or the memory card 64, and has a determining device for determining to reproduce the sound with the moving image or reproduce only the moving image. The determining device is the up key and the down key of the cross key 30 in FIG. 2.

After the user determines to reproduce the whole moving image at step 26, the user presses the up key or the down key to determine to reproduce the sound with the moving image or reproduce only the moving image (step 40). If the user presses the up key, the moving image is displayed on the image monitor 34 and the sound is reproduced from the speaker 36 (step 42). If the user presses the down key at step 40, the moving image is displayed on the image monitor 34 and the sound is not reproduced (step 44).

The determining device is the up key and the down key of the cross key 30 in the embodiment, but a special switch may be provided. Also, a switch for determining to reproduce the sound or not and a switch for determining to reproduce the moving image may be separately provided. If the digital camera 1 can record sound in the still image shooting mode and the sound can be reproduced at the one-frame reproduction, the user may determine to reproduce the sound with the still image or reproduce only the still image.

The present invention is applied to the digital camera 1 in the embodiment, but the present invention is not limited to this. It may be applied to any image reproducing apparatus with the image reproducing function and any apparatus including the image reproducing apparatus.

As set forth hereinabove, according to the present invention, the display style of the still image is different from that of the part of the moving image in the one-frame reproduction, and the display style of the index image of the still image is different from that of the index image of the moving image in the index reproduction. Thus, the user can distinguish the still image from the part of the moving image when looking at them, and therefore the user can reproduce only the desired moving image.

Also, in the one-frame reproduction or the index reproduction, the frames of the beginning part, the middle part and the end part of the moving image are displayed together or they are displayed consecutively and repeatedly. Thus, the user can grasp the whole moving image before reproducing it, and therefore the user can reproduce only the desired moving image.

In addition, the user can determine whether to reproduce the sound with the image or reproduce only the image in the image reproduction. Thus, the user can reproduce only the image without the sound in order not to bother people when the user needs to be quiet. Also, the operator can do this manually so that manual volume control is not necessary.

It should be understood, however, that there is no intention to limit the invention to the specific forms disclosed, but on the contrary, the invention is to cover all modifications alternate constructions and equivalents falling within the spirit and scope of the invention as expressed in the appended claims.

What is claimed is:

1. An apparatus comprising:
   a cross key that selects a file from a recording medium in which at least file images with sound are stored by operating a left/right key; and that selects either image reproduction with sound and image reproduction without sound when the image with sound is reproduced by operating an up/down key;
   a display device that displays at least images with sound;
   a display control device that displays an image with sound recorded in the file selected by operating the left/right key of the cross key on the display device; and
   a sound reproducing device that reproduces sound of an image with sound, the sound reproduction device reproducing sound of an image with sound when image reproduction with sound is selected by operating the up/down key of the cross key and prohibiting sound reproduction of the moving image with sound when an image without sound is selected.

2. The image reproducing apparatus according to claim 1, wherein
   the recording medium stores files of still images without sound, still images with sound, moving images without sound, or moving images with sound, and the sound reproducing device reproduces sound only when a file of a still image with sound or a file of a moving image with sound is selected by operating the up/down key of the cross key, and image reproduction with sound is selected by operating the up/down key of the cross key.

3. A digital camera, comprising:
   a shooting mode selecting device that selects either still image shooting mode or moving image shooting mode;
   an acquisition device that acquires a still image without sound or still image with sound when the still image shooting mode is selected and acquires a moving image without sound or moving image with sound when the moving image shooting mode is selected;
   a recording device that records a file of a still image without sound or a still image with sound acquired during the still image shooting mode, and a file of a moving image without sound or a moving image with sound acquired during the moving image shooting mode in a recording medium;
   a cross key that selects a file from the recording medium by operating a left/right key and selects either image reproduction with sound or image reproduction without sound when the still image with sound or moving image with sound is reproduced by operating an up/down key;
   a display device that displays a still image or a moving image;
   a display control device that, when a still image is recorded in the file selected by operating the left/right key of the cross key, displays the still image on the display device, and when a moving image is recorded in the file selected by operating the left/right key of the cross key, displays the moving image on the display device; and
   a sound reproducing device that reproduces sound of the still image with sound or moving image with sound, the sound reproducing device reproducing sound of the still image with sound or the moving image with sound when image reproduction with sound is selected by operating the up/down key of the cross key, and prohibiting reproduction of sound of the still image with sound or the moving image with sound when image reproduction without sound is selected.

4. An image reproducing apparatus, comprising:
   a selecting device that selects a file from a recording medium in which both files of still images and files of moving images are stored;
   a display device that displays a still image or a moving image;
   a first display control device that, when a still image is recorded in a file selected by the selecting device, displays the still image on the display device;
   a second display control device that, when a moving image is recorded in a file selected by the selecting device, repetitively reproduces some frames within the range of overall frames that constitute the moving image to make the image look animated, so that the moving image is displayed in a simplified format on the display device; and
   a third display control device that displays a moving image in a file currently selected by the selecting device on the display device if reproduction of a moving image is instructed while the moving image is displayed in a simplified format on the display device, wherein,
   the second display control device, when a moving image is recorded in a file selected by the selecting device, repetitively reproduces some consecutive frames within the range of overall frames that constitute the moving image to make the image look animated, so that the moving image is displayed in a simplified format on the display device.

5. A digital camera, comprising:
   a shooting mode selecting device that selects either still image shooting mode or moving image shooting mode;
   an imaging device that takes a still image when the still image shooting mode is selected and takes a moving image when the moving image shooting mode is selected;
   a recording device that records files of the taken still images and moving images to a recording medium;
   a selecting device that selects a file from the recording medium in which both the files of still images and the files of moving images are stored;
   a display device that displays a still image or a moving image;
   a first display control device that, when a still image is recorded in the file selected by the selecting device, displays the still image on the display device;
   a second display control device that, when a moving image is recorded in the file selected by the selecting device, repetitively reproduces some frames in the range of all frames constituting the moving image so that the images have a movement and so as to display the moving image on the display device in a simplified format; and a third display control device that displays the moving image in the file that is currently selected by the selecting device on the display device when reproduction of a moving image is instructed while the moving image is displayed on the display device in a simplified format, wherein, the second display control device, when a moving image is recorded in a file selected by the selecting device, repetitively reproduces some consecutive frames within the range of overall frames that constitute the moving image to make the image look animated, so that the moving image is displayed in a simplified format on the display device.

6. A digital camera, comprising:

a shooting mode selecting device that selects either still image shooting mode or moving image shooting mode;

an imaging device that takes a still image when the still image shooting mode is selected and takes a moving image when the moving image shooting mode is selected;

a recording device that records a file of the taken still image and a file of the moving image in a recording medium;

an index display instructing device that selects files from the recording medium and instructs display of index images that include a plurality of frames corresponding to still images or moving images in the files;

a display device that displays a still image, moving image, or index image;

a first display control device that, when the index display instructing device instructs display of index images, constructs the index images based on a plurality of files stored in the recording medium and displays the index images on the display device, the first display control device repetitively reproducing some frames within the range of all frames that constitute an moving image to make the image look animated with respect to frames that correspond to moving images among the frames making up the index images so as to display the moving image in a simplified format;

a selecting device that selects an arbitrary frame from index images displayed on the display device;

a second display control device that, when a still image is recorded in a file that corresponds to the frame selected by the selecting device, displays the still image on the display device; and a third display control device that, when a moving image is recorded in a file that corresponds to the frame selected by the selecting device, displays the moving image on the display device, wherein, a first display control device that, when the index display instructing device instructs display of index images, constructs the index images based on a plurality of files stored in the recording medium and displays the index images on the display device, the first display control device repetitively reproducing some consecutive frames within the range of all frames that constitute a moving image to make the image look animated for frames that correspond to moving images among the frames constituting the index images so as to display the moving image in a simplified format.

* * * * *